(12) United States Patent
Xia et al.

(10) Patent No.: US 12,079,419 B2
(45) Date of Patent: Sep. 3, 2024

(54) TOUCH ARRAY SUBSTRATE, TOUCH POSITIONING METHOD AND DISPLAY PANEL

(71) Applicant: HKC CORPORATION LIMITED, Shenzhen (CN)

(72) Inventors: Tianyu Xia, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/334,520

(22) Filed: Jun. 14, 2023

(65) Prior Publication Data

US 2024/0192798 A1 Jun. 13, 2024

(30) Foreign Application Priority Data

Dec. 8, 2022 (CN) .......................... 202211568287.9

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/04166* (2019.05); *G06F 3/0446* (2019.05)

(58) Field of Classification Search
CPC . G06F 3/04164; G06F 3/04166; G06F 3/0412
See application file for complete search history.

(56) References Cited

U.S. PATENT DOCUMENTS

2011/0291982 A1* 12/2011 Hsieh .................... G06F 3/0443
 345/173
2012/0013544 A1 1/2012 Philipp
(Continued)

FOREIGN PATENT DOCUMENTS

CN 101464758 A 6/2009
CN 201570006 U 9/2010
(Continued)

OTHER PUBLICATIONS

First Office Action issued in counterpart Chinese Patent Application No. 202211568287.9, dated Feb. 3, 2023.
(Continued)

*Primary Examiner* — Kevin M Nguyen
(74) *Attorney, Agent, or Firm* — Westbridge IP LLC

(57) ABSTRACT

Disclosed are a touch array substrate, a touch positioning method and a display panel. The touch array substrate includes: a plurality of receiving lines, a plurality of transmitting lines and a transmitting driven unit. Each receiving line is connected to the reception and detection terminal of the timing controller, each transmitting line can be with the plurality of receiving lines to form a plurality of corresponding touch capacitors; a plurality of clock input terminals of the transmitting driven unit are connected to the plurality of clock output terminals of the timing controller one-by-one; a plurality of output terminals of the transmitting driven unit are connected to input terminals of the plurality of the transmitting lines one-by-one, and the transmitting driven unit can sequentially output transmitting driven signals to the plurality of transmitting lines according to a plurality of received clock signals, to drive the transmitting lines to work sequentially.

6 Claims, 6 Drawing Sheets

(56) References Cited

U.S. PATENT DOCUMENTS

| | | | |
|---|---|---|---|
| 2013/0314360 A1* | 11/2013 | Saitoh | G06F 3/0412 |
| | | | 345/173 |
| 2018/0217712 A1 | 8/2018 | Teranishi et al. | |
| 2022/0155937 A1* | 5/2022 | Jo | G06F 3/04184 |
| 2022/0208100 A1* | 6/2022 | Jung | G09G 3/3258 |

FOREIGN PATENT DOCUMENTS

| | | |
|---|---|---|
| CN | 102193698 A | 9/2011 |
| CN | 202677328 U | 1/2013 |
| CN | 103034364 A | 4/2013 |
| CN | 103149748 A | 6/2013 |
| CN | 104598089 A | 5/2015 |
| CN | 110427128 A | 11/2019 |
| CN | 115657878 A | 1/2023 |
| KR | 20140083888 A | 7/2014 |
| KR | 20160040504 A | 4/2016 |

OTHER PUBLICATIONS

Grant Notification issued in counterpart Chinese Patent Application No. 202211568287.9, dated Mar. 6, 2023.
International Search Report and Written Opinion issued in counterpart PCT Application No. PCT/CN2023/095144, dated Jun. 29, 2023
Second Office Action issued in counterpart Chinese Patent Application No. 202211568287.9, dated Feb. 23, 2023.

* cited by examiner

TOUCH ARRAY SUBSTRATE, TOUCH POSITIONING METHOD AND DISPLAY PANEL

CROSS-REFERENCE TO RELATED APPLICATIONS

This application claims priority to Chinese Patent Application No. 202211568287.9, filed on Dec. 8, 2022, which is hereby incorporated by reference in its entirety.

TECHNICAL FIELD

The present disclosure relates to the technical field of touch screens, and in particular to a touch array substrate, a touch positioning method and a display panel.

BACKGROUND

At present, the In-cell touch screens all adopt a self-capacitance structure, that is, a plurality of touch blocks made of indium tin oxide are provided in the display area of the array substrate, and a change in the capacitance of each touch block is monitored within the touch time by the timing controller in the background to determine the touch position. However, such structure of the touch screen limits the number of touch blocks placed thereon due to the number of ports of the timing controller in the background, resulting in a low accuracy of the touch recognition.

SUMMARY

The main purpose of the present disclosure is to provide a touch array substrate, aiming to solve the problem that the accuracy of the touch recognition is limited by the number of ports of the timing controller in the background, resulting in the low accuracy of the touch recognition.

In order to achieve the above purpose, the present disclosure provides a touch array substrate including a timing controller, the timing controller is provided with a plurality of clock output terminals and a plurality of reception and detection terminals, each clock output terminal is used to output a clock signal, and each reception and detection terminal is used to detect the signal potential of the connected receiving line, and the touch array substrate includes: a plurality of receiving lines, a plurality of transmitting lines and a transmitting driven unit;

each receiving line is connected to the reception and detection terminal of the timing controller;

each transmitting line can be with the plurality of receiving lines to form a plurality of corresponding touch capacitors; and a plurality of clock input terminals of the transmitting driven unit are connected to the plurality of clock output terminals of the timing controller one-by-one;

a plurality of output terminals of the transmitting driven unit are connected to input terminals of the plurality of the transmitting lines one-by-one; and the transmitting driven unit can sequentially output transmitting driven signals to the plurality of transmitting lines according to a plurality of received clock signals, to drive the plurality of transmitting lines to work sequentially.

In an embodiment, the touch array substrate includes a transmitting line wiring layer, a scanning line wiring layer, a data line wiring layer and a receiving line wiring layer stacked sequentially; and the plurality of transmitting lines are provided in the transmitting line wiring layer, and the plurality of the receiving lines are provided in the receiving line wiring layer.

In an embodiment, a plurality of scanning lines are provided in the scanning line wiring layer, and a plurality of data lines are provided in the data line wiring layer; and an extension direction of each transmitting line is the same as an extension direction of each scanning line, and an extension direction of each receiving line is the same as that of each data line.

In an embodiment, each transmitting line is provided on a side of each scanning line facing away from the data line wiring layer.

In an embodiment, a gap is provided between any two adjacent receiving lines, and each gap is provided with two opposite ends;

each transmitting line includes: a main transmitting line and at least one first auxiliary transmitting line;

an extension direction of the main transmitting line is the same as an extension direction of each scanning line; and each first auxiliary transmitting line is provided in the gap, a first end of each first auxiliary transmitting line is connected to the main transmitting line, and a second end of each first auxiliary transmitting line is extended toward any one end of the gap.

In an embodiment, each transmitting line further includes: at least one second auxiliary transmitting line;

each second auxiliary transmitting line is provided in the gap where the first auxiliary transmitting line is provided;

a first end of each second auxiliary transmitting line is connected to the main transmitting line, and a second end of each second auxiliary transmitting line is extended toward another end of the gap.

In an embodiment, each first auxiliary transmitting line is the same in length as each second auxiliary transmitting line.

In an embodiment, the plurality of clock output terminals of the timing controller sequentially output clock signals with a first preset potential; and the transmitting driven unit includes: a plurality of row driving circuits;

a clock input terminal of each row driving circuit is connected to the clock output terminal of the timing controller, and an output terminal of each row driving circuit is connected to the transmitting line; and each row driving circuit can output the transmitting driven signal to the connected transmitting line when receiving the clock signal with the first preset potential.

The present disclosure also provides a touch positioning method, applied on the touch array substrate as mentioned above, including:

controlling the plurality of clock output terminals to sequentially output clock signals with a first preset potential, and detecting signal potentials of the plurality of receiving lines through the plurality of reception and detection terminals, respectively;

determining whether the signal potentials of the plurality of receiving lines are fluctuated;

in determination that the signal potential of at least one receiving line is fluctuated, determining a currently driven transmitting line and each receiving line whose signal potential is fluctuated; and positioning a touch position according to the determined transmitting line and each receiving line.

The present disclosure also provides a display panel, including: a color film substrate, a liquid crystal layer, and the touch array as mentioned above, the liquid crystal layer is provided between the touch array substrate and the color film substrate.

The technical solution of the present disclosure adopts a plurality of receiving lines, a plurality of transmitting lines and a transmitting driven unit. The timing controller is provided with a plurality of clock output terminals and a plurality of reception and detection terminals, each clock output terminal is used to output a clock signal, each reception and detection terminal is used to detect the signal potential of the connected receiving line, each receiving line is connected to the reception and detection terminal of the timing controller, and each transmitting line is used to be with the plurality of receiving lines to form a plurality of corresponding touch capacitors. The plurality of clock input terminals of the transmitting driven unit are connected to the plurality of clock output terminals of the timing controller one-by-one, and the plurality of output terminals of the transmitting driven unit are connected to input terminals of the plurality of the transmitting lines one-by-one. The transmitting driven unit is used to sequentially output transmitting driven signals to the plurality of transmitting lines according to the plurality of clock signals connected, so as to drive the plurality of transmitting lines to work sequentially. The touch array substrate of the present disclosure realizes the touch position recognition through the m+n ports of the timing controller, which greatly reduces the number of the ports compared with the m×n ports required to achieve the same accuracy of the touch recognition in the related art, and the higher accuracy of the touch recognition can be realized. In this way, the problem that the accuracy of the touch recognition limited by the number of ports of the timing controller in the background is low is solved, and more ports of the timing controller are reserved for other functional designs on the premise that the same accuracy of the touch recognition can be realized, which increases the flexibility of the design.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the prior art. Obviously, the drawings in the following description are only part of embodiments of the present disclosure. For those of ordinary skill in the art, other drawings can also be obtained according to the structures shown in these drawings without any creative effort.

The achievement of the purpose, functional characteristics and advantages of the present disclosure will be further described with reference to the accompanying drawings in conjunction with embodiments.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by those skilled in the art based on the embodiments of the present disclosure without creative efforts shall fall within the scope of the present disclosure.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions of the various embodiments can be combined with each other, but must be based on the realization by those skilled in the art. When the combination of technical solutions is contradictory or cannot be realized, it should be considered that the combination of such technical solutions does not exist or fall within the scope of protection claimed in this disclosure.

The present disclosure provides a touch array substrate.

In an embodiment, an In-cell self-capacitance touch display screen is formed with a touch array through a plurality of touch blocks provided in an array in the touch array substrate. Each touch block is connected to a port of the timing controller in the background, so that the timing controller can determine a touch position through detecting a change in the capacitance of each touch block. Since an accuracy of the touch recognition of the touch array is proportional to the number of touch blocks, and the number of touch blocks is limited by the number of ports of the timing controller in the background, the accuracy of the touch recognition of the touch array is greatly limited when the number of ports of the timing controller in the background is limited.

Figure 1:
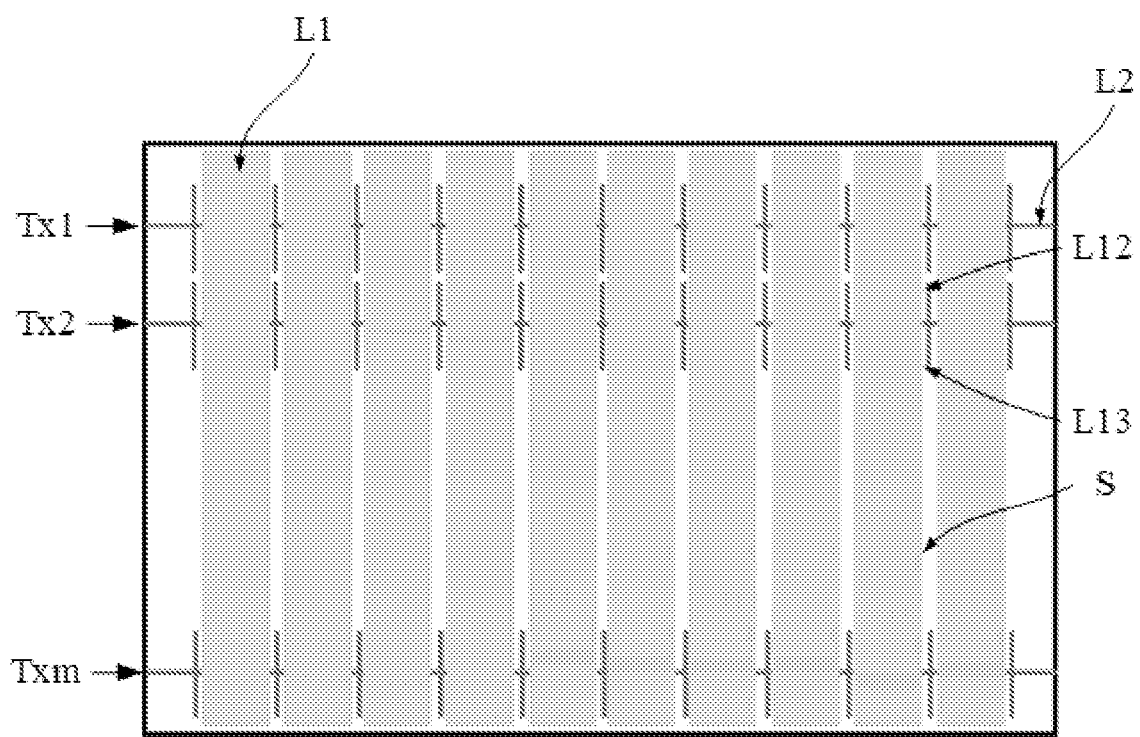
FIG. 1 is a schematic structural view of a touch array substrate according to an embodiment of the present disclosure.
Figure 2:
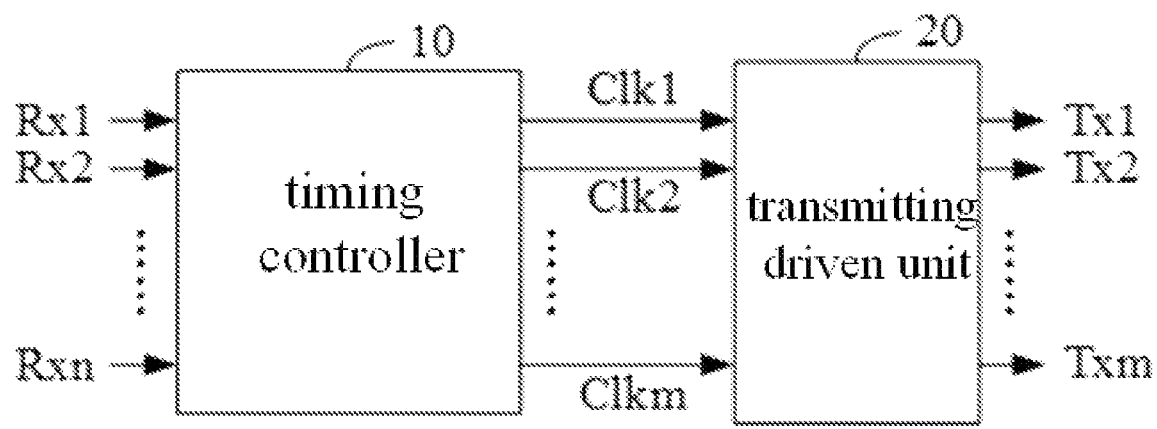
FIG. 2 is a schematic circuit view of a timing controller and a transmitting driven unit in a touch array substrate according to an embodiment of the present disclosure.

In order to solve the above problem, referring to FIG. 1 and FIG. 2, in an embodiment, the touch array substrate includes: a plurality of receiving lines L1, a plurality of transmitting lines L2, and a transmitting driven unit 20.

Each receiving line L1 is connected to a reception and detection terminal of the timing controller 10, and each transmitting line L2 is used to be with the plurality of receiving lines L1 to form a plurality of corresponding touch capacitors. A plurality of clock input terminals of the transmitting driven unit 20 are connected to the plurality of clock output terminals of the timing controller 10 one-by-one, and the plurality of output terminals of the transmitting driven unit 20 are connected to input terminals of the plurality of the transmitting lines L2 one-by-one. The transmitting driven unit 20 is used to sequentially output transmitting driven signals (TX1~TXm) to the plurality of transmitting lines L2 to sequentially drive the plurality of transmitting lines L2 to work according to the plurality of clock signals (Clk1~Clkm) connected.

In the embodiment, the timing controller 10 may be provided with a plurality of clock output terminals and a plurality of reception and detection terminals. Each clock output terminal is used to output a clock signal, and each reception and detection terminal is used to detect a signal potential of the connected receiving line L1. The touch array substrate may include an effective display area and a non-effective display area. The number of receiving lines L1 and the number of transmitting lines L2 can be determined according to a resolution of the effective display area and the accuracy of the touch recognition to be achieved, which are not repeated here. For example, when the resolution of the effective display area is full high-definition, that is, when the effective display area is provided with a 1920*1080 pixel array, a ratio of the number of transmitting lines L2 to the number of rows of the pixels can be 1:18, that is, 60 receiving lines L1 can be provided. It should be noted that only three transmitting lines L2 are shown in FIG. 1 to illustrate a structural relationship between the transmitting line L2 and the receiving line L1, but in practical applications, more transmitting lines L2 can be provided.

A plurality of wiring layers can be provided in the effective display area, and the plurality of receiving lines L1 and the plurality of transmitting lines L2 can be respectively provided in different wiring layers, so that each receiving line L1 is not in contact with each transmitting line L2. In the effective display area, a routing direction of each receiving line L1 can be identical, and a routing direction of each transmitting line L2 can be identical, but the routing direction of each receiving line L1 can be non-parallel to the routing direction of each receiving line L2, so that the plurality of receiving lines L1 and the plurality of transmitting lines L2 can cross to form a touch grid covering the effective display area and/or the non-effective display area. Each transmitting line L2 has a plurality of areas facing directly the plurality of receiving lines L1, and each receiving line L1 also has a plurality of areas facing directly the plurality of transmitting lines L2, so that each transmitting line L2 can respectively form a plurality of capacitive structures with the plurality of receiving lines L1, that is, the touch capacitive structure.

The transmitting driven unit 20 can be realized through a thin film transistor and a capacitor device. The transmitting driven unit 20 can run a pre-integrated hardware circuit and software program or an algorithm to generate transmitting driven signals (TX1~TXm) according to a potential value of connected clock signals, and can output the transmitting driven signals (TX1~TXm) to the plurality of transmitting lines L2 through the plurality of output terminals, so as to drive the plurality of transmitting lines L2 one-by-one. In other words, in the present disclosure, only one transmitting line L2 works at one time, and other transmitting lines L2 do not work. At this time, each receiving line L1 can be configured to receive a stable receiving driven signal, or not to receive the driving signal, that is, to be in a suspended state, so that an electric field may be generated in the touch capacitor between the currently driven transmitting line L2 and the plurality of receiving lines L1. In the embodiment, both the transmitting driven signals (TX1~TXm) and the receiving driven signals can be high-potential signals. The plurality of receiving driven signals can be generated by a receiving driven circuit or a timing controller 10, and can be respectively output to the plurality of receiving lines L1 through a receiving driven circuit and the plurality of receiving driven signal output terminals of the driving circuit or the timing controller 10, so as to drive the plurality of receiving lines L1.

When the touch array substrate is touched and pressed, the electric field of at least one touch capacitor corresponding to a pressed part will change, and the signal potential on the receiving line L1 corresponding to each touch capacitor will fluctuate, so that the timing controller 10 can determine a touched and pressed position and achieve the touch positioning through obtaining a position of the currently driven transmitting line L2 in the plurality of transmitting lines L2 and a position of each receiving line L1 whose the signal potential is fluctuated in the plurality of receiving lines L1. In this way, under a premise of achieving a same accuracy of the touch recognition, for example, the number of touch detecting points is m×n, m and n are both positive integers and not less than 1. Since each touch block in the related art is one touch detecting point, m×n touch blocks are required, that is, 10 m×n ports of the timing controller in the background are required. In the present disclosure, each touch capacitor is a touch detecting point, so only m transmitting lines L2 and n receiving lines L1 are required, that is, 10 m clock output terminals and n receiving lines of the timing controller in the background are required. A total number of ports required is m+n, which greatly reduces the number of ports required to achieve the same accuracy of the touch recognition. Therefore, when the number of ports of the timing controller 10 is fixed, a more accurate touch recognition can be achieved in the present disclosure, to solve the problem that the accuracy of the touch recognition is limited by the number of ports of the timing controller in the background 10 and is low, and more ports of the timing controller 10 are reserved for other functional designs under the premise of achieving the same accuracy of the touch recognition, to increase the flexibility of the design.

Figure 3:
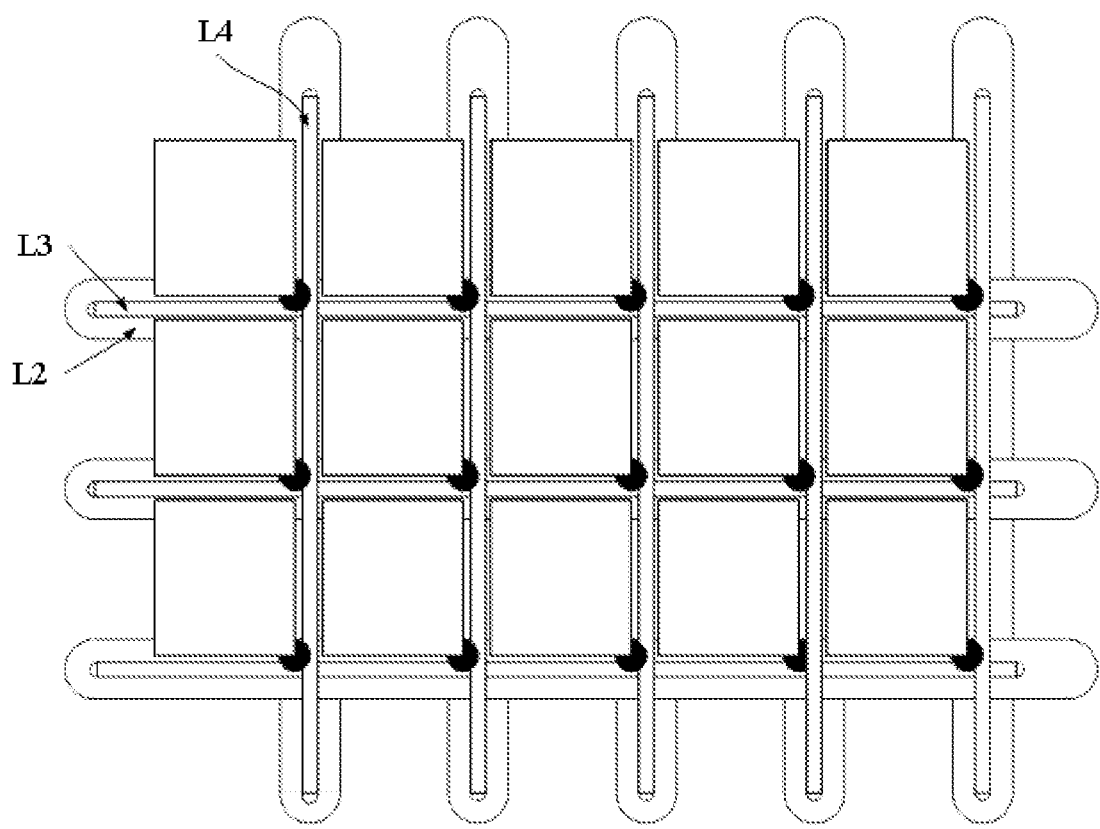
FIG. 3 is a structural schematic view of the touch array substrate according to an embodiment of the present disclosure.

Referring to FIG. 3, in an embodiment, the touch array substrate comprises a transmitting line wiring layer, a scanning line wiring layer, a data line wiring layer, and a receiving line wiring layer stacked sequentially.

The plurality of transmitting lines L2 are provided in the transmitting line wiring layer, and the plurality of receiving lines L1 are provided in the receiving line wiring layer.

In the embodiment, the transmitting line wiring layer, the scanning line wiring layer, the data line wiring layer, and the receiving line wiring layer may be sequentially stacked and formed on a glass substrate. The scanning line wiring layer can be provided with a plurality of scanning lines L3 that are extended along a length direction of the effective display area, the data line wiring layer can be provided with a plurality of data lines L4 that are extended along a width direction of the effective display area, and the plurality of scanning lines L3 are crossed with the plurality of data lines L4 to divide the effective display area into pixel arrays. In this way, the transmitting line wiring layer can be realized through a MO metal wiring layer on the glass substrate, and the receiving line wiring layer can be realized through the touch block setting layer, which realizes the same film layer structure as the existing In-cell touch array substrate without an additional film layer, and a difficulty of the process is reduced.

In an embodiment, an extension direction of each transmitting line L2 is same as each scanning line L3, that is, each transmitting line L2 is parallel to each scanning line L3. An extension direction of each receiving line L1 is same as each data line L4, that is, each receiving line L1 is parallel to each data line L4. In this way, a touch grid formed by the plurality of receiving lines L1 and the plurality of transmitting lines L2 can effectively correspond to the pixel array, which improves a consistency between the touch grid and the pixel array, and improves the accuracy of subsequent determination of the function to be performed based on touch positioning.

In an embodiment, each transmitting line L2 is provided on a side of each scanning line L3 facing away from the data line wiring layer.

When a width of the transmitting line L2 is less than or equal to a width of the scanning line L3, the transmitting line L2 can be considered to be entirely located in a projection of the scanning line L3 on the glass substrate. At this time, an influence on an aperture ratio of the pixel is equal to an original influence of the scanning line L3 on an aperture ratio, to minimize the influence of each transmitting line L2 on the aperture ratio of the pixel is minimized, and improve the display effect.

When the width of the transmitting line L2 is greater than the width of the scanning line L3, the transmitting line L2 can be considered to be partially located in the projection of the scanning line L3 on the glass substrate. At this time, the influence of the transmitting line L2 on aperture ratio of the pixel is only relevant to a partial volume beyond the projection, which also reduces the influence of the routing of the transmitting line L2 on the aperture ratio of the pixel, compared to a dislocation arrangement of the transmitting line L2 and the scanning line L3 in the vertical direction.

In an embodiment, referring to FIG. 1 and FIG. 3, a gap S is provided between any two adjacent receiving lines L1, and each gap S is provided with two opposite ends.

Each transmitting line L2 includes: a main transmitting line L21 and at least one first auxiliary transmitting line L22. An extension direction of the main transmitting line L21 is the same as an extension direction of each scanning line L3, each first auxiliary transmitting line L22 is provided in the gaps S, a first end of each first auxiliary transmitting line L22 is connected to the main transmitting line L21, and a second end of each first auxiliary transmitting line L22 extends toward any end of the gap S where it is provided.

Any two adjacent receiving lines L1 can be spaced by a preset distance, so that the gap S formed between any two adjacent receiving lines L1 is rectangular, long and narrow, and the influence of the receiving line L1 on the aperture ratio of the pixel is reduced. A projected area of each gap S on the glass substrate can be the same, which increases the uniformity of the display effect.

In the embodiment, the number of first auxiliary transmitting line L22 is not less than 1 and not greater than the number of the gap S. The specific number of the first auxiliary transmitting line L22 can be set according to actual needs, which is not limited here. It can be understood that each gap S may be provided with a first end and a second end opposite to the first end along the routing direction of the data line L4, and an orientation direction of the second end of the first auxiliary transmitting line L22 in each gap S may be the same or different from each other, which is not limited here. In this way, the touch area corresponding to each touch capacitor is increased.

In an embodiment, each transmitting line L2 further includes at least one second auxiliary transmitting line L23. Each second auxiliary transmitting line L23 is provided in the gap S where the first auxiliary transmitting line L22 is provided, and a first end of each second auxiliary transmitting line L23 is connected to the main transmitting line L21, and a second end of each second auxiliary transmitting line L23 is extended toward another end of the gap S.

In the embodiment, the number of second auxiliary transmitting lines L23 is not less than 1 and not greater than the number of the first auxiliary transmitting lines L22. The specific number of the second transmitting line L2 can be set according to actual needs, and is not limited here. Each second auxiliary transmitting line L23 is provided in the gap S where the first auxiliary transmitting line L22 is provided, and is extended in a direction away from the first auxiliary transmitting line L22, so that the touch area corresponding to each touch capacitor is increased.

Referring to FIG. 1, in an embodiment, each gap S is provided with the first auxiliary transmitting line L22 and the second auxiliary transmitting line L23, and the length of each first auxiliary transmitting line L22 is equal to the length of each second auxiliary transmitting line L23, which improves the consistency of each touch capacitor.

Figure 4:
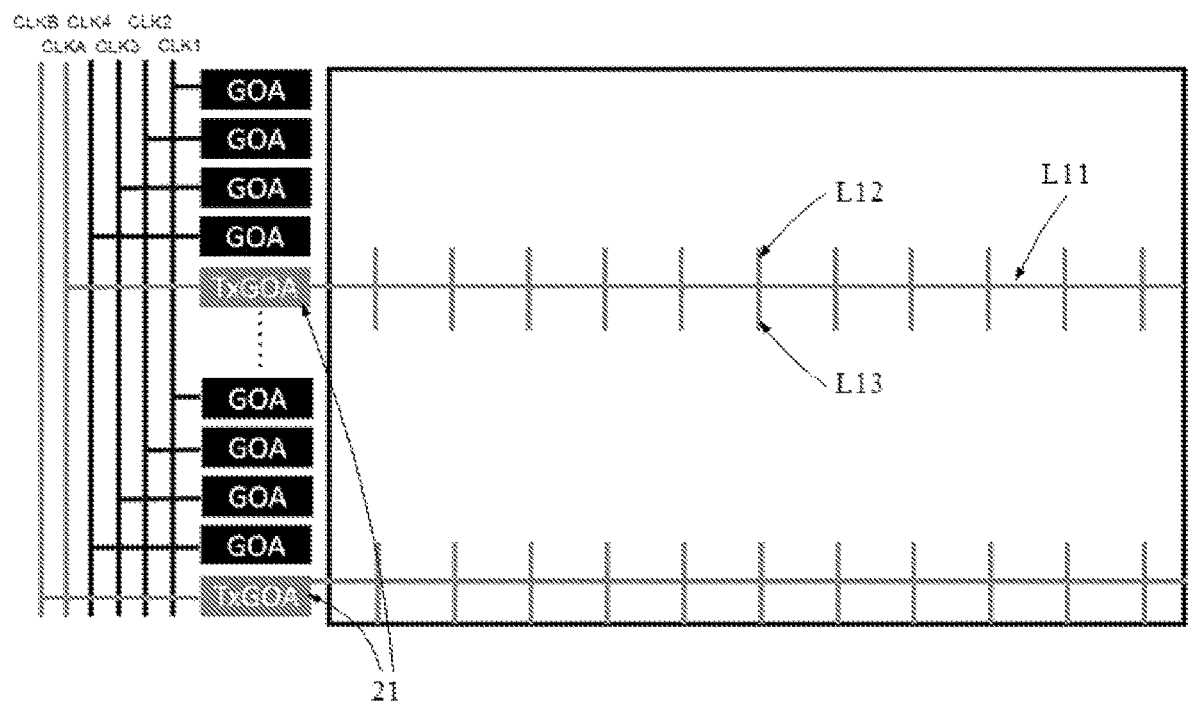
FIG. 4 is a schematic view of a position of a transmitting line wiring layer in the touch array substrate according to an embodiment of the present disclosure.

Referring to FIG. 4, in an embodiment, the plurality of clock output terminals of the timing controller 10 sequentially output clock signals with a first preset potential.

The transmitting driven unit 20 includes a plurality of row driving circuits 21, a clock input terminal of each row driving circuit 21 is connected to a clock output terminal of the timing controller 10, and the clock input terminal of each row driving circuit 21 is connected to the transmitting line L2. Each row driving circuit 21 is configured to output a transmitting driven signal (TX1~TXm) to the connected transmitting line L2 when receiving a clock signal of a first preset potential.

In the embodiment, the row driving circuit 21 can be provided in the non-display area, and the row driving circuit 21 can be additional and specialized, that is, the TxGOA in FIG. 4. The GOA in FIG. 4 is a display row driving circuit for outputting the scanning signal to the scanning line L3. The clock input terminal of each row driving circuit 21 can be connected to the clock output terminal of the timing controller 10 through a clock signal line, so as to receive a clock signal. The clock signal has a first preset potential and a second preset potential opposite to the first preset potential, and the first preset potential can be a high potential. Each row driving circuit 21 can control a corresponding thin film transistor to turn on or turn off when receiving the clock signal of the first preset potential, and each turned on thin film transistor outputs the clock signal of the first preset potential as a transmitting driven signal (TX1~TXm), so as to drive the connected transmitting line L2. In other words, only one of the plurality of row driving circuits 21 outputs the transmitting driven signal (TX1~TXm) of the first preset potential, and others of the plurality of row driving circuits 21 output the transmitting driven signals (TX1~TXm) of the second preset potential. FIG. 4 only shows an occasion where two TxGOAs are respectively connected to one clock signal (ClkA, ClkB).

In actual use, each row driving circuit 21 also is provided with a plurality of signal input terminals with other functions, including but not limited to a row opening signal input terminal, a row closing signal input terminal, and a reset signal input terminal. The plurality of signal input terminals with other functions of each row driving circuit 21 can be correspondingly connected to the existing signal lines for various function in the non-effective display area, which can not only avoid further occupying the number of output ports of the timing controller 10, but can also reduce the number of signal routing in the non-effective display area, to reduce the area of the effective display area.

The present disclosure also provides a touch positioning method.

The touch positioning method is applied on the touch array substrate, the specific structure of the touch array substrate can be referred to the embodiments. Since the touch positioning method adopts all the technical solutions of all the embodiments, it has at least all the advantages brought by the technical solutions of the embodiments, which will not be repeated here.

Figure 5:
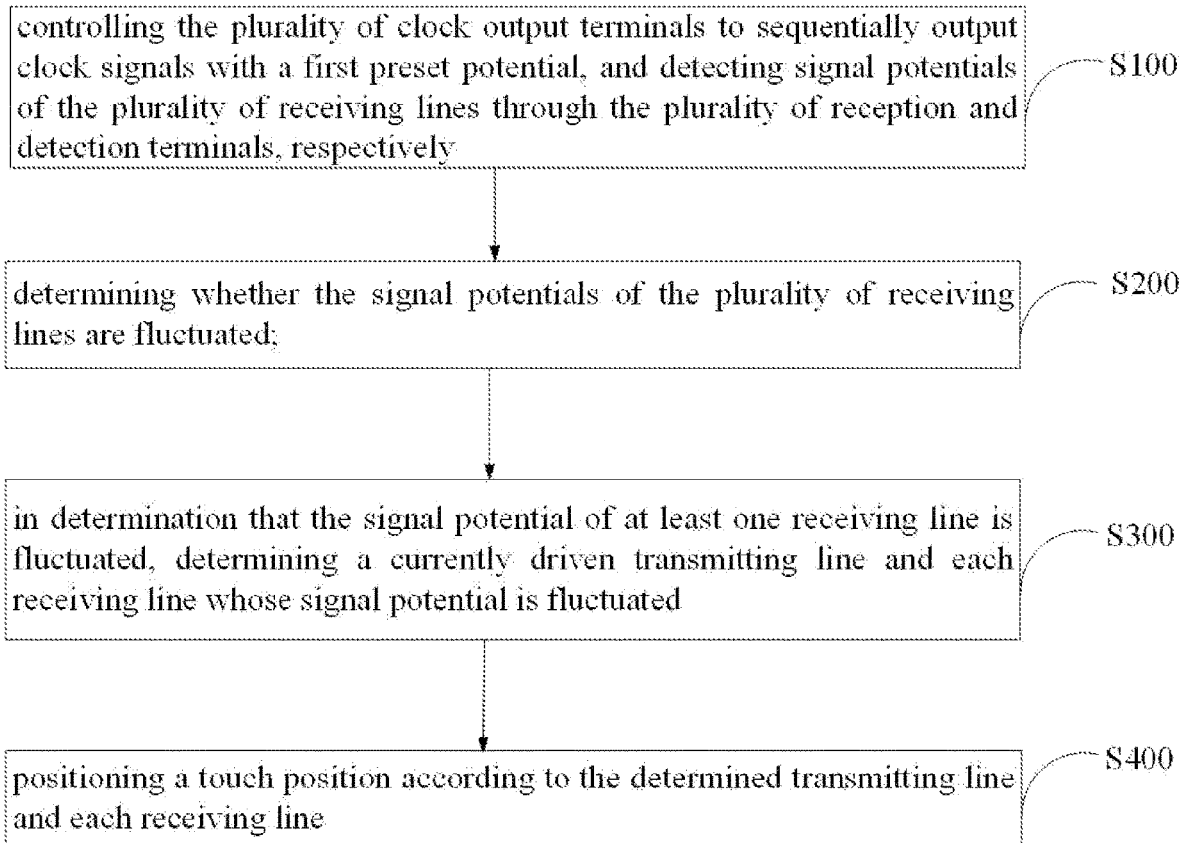
FIG. 5 is a schematic flowchart of a touch positioning method according to an embodiment of the present disclosure.

Referring to FIG. 5, in an embodiment, the touch positioning method includes:

S100: controlling the plurality of clock output terminals to sequentially output clock signals with a first preset potential, and detecting signal potentials (RX1~RXn) of the plurality of receiving lines L1 through the plurality of reception and detection terminals;

S200: determining whether the signal potentials (RX1~RXn) of the plurality of receiving lines L1 are fluctuated;

S300: in determination that the signal potential of at least one receiving line is fluctuated, determining a currently driven transmitting line L2 and each receiving line L1 whose signal potential is fluctuated;

S400: positioning the touch position according to the determined transmitting line L2 and each receiving line L1.

In the embodiment, an execution subject of the touch positioning method may be the timing controller 10. The timing controller 10 can generate a clock signal with the first preset potential by running an integrated hardware circuit or a software and an algorithm when receiving the touch positioning enable signal, and sequentially output to the plurality of row driving circuits 21 in the transmitting driven unit 20 through a plurality of clock output terminals. In this way, the plurality of row driving circuits 21 in the transmitting driven unit 20 can sequentially output transmitting driven signals (TX1~TXm) to the plurality of transmitting lines L2, so that the plurality of transmitting lines L2 are driven to work sequentially, and a touch function of the entire column of substrates is turned on. At this time, the plurality of clock signals (Clk1~Clkm) are square wave signals opposite to each other. The timing controller 10 can obtain the signal potentials (RX1~RXn) of the plurality of receiving lines L1 by simultaneously detecting the potentials of the plurality of connected receiving lines L1 through the plurality of reception and detection terminals. When not receiving the touch positioning enable signal, the timing controller 10 can output a plurality of clock signals in the second preset potential to the plurality of row driving circuits 21 in the transmitting driven unit 20, so that the plurality of row driving circuits 21 in the transmitting driven unit 20 can output a plurality of row-off signals to the plurality of transmitting lines L2. At this time, the receiving driven unit can output a plurality of common electrode signals to the plurality of receiving lines L1, so as to turn off the touch function of the touch array substrate.

The timing controller 10 can analyze and calculate the signal potentials (RX1~RXn) connected to each reception and detection terminal to determine a real-time potential parameter of each signal potential (RX1~RXn), and determine whether the signal potentials (RX1~RXn) of the plurality of receiving lines L1 are fluctuated by comparing the real-time parameter with a preset interval of the potential parameter or a preset threshold of the potential parameter. The signal parameters include but are not limited to: a period, a duty cycle, and an amplitude, etc.

When the timing controller 10 determines that at least one signal potential among the detected signal potentials (RX1~RXn) is fluctuated, the timing controller 10 can determine a corresponding receiving line L1 according to the clock signal output terminal which outputs the clock signal of the first preset potential. The timing controller 10 can also determine each receiving line L1 with a fluctuated signal potential according to each reception and detection terminal whose signal potential is fluctuated.

The timing controller 10 can be pre-integrated with a corresponding software program or an algorithm to calculate a position of an interaction area between the transmitting line L2 and the receiving line L1 in the effective display area according to the determined transmitting line L2 and each receiving line L1, so as to realize the positioning of the touch position.

The present disclosure also provides a display panel.

Figure 6:
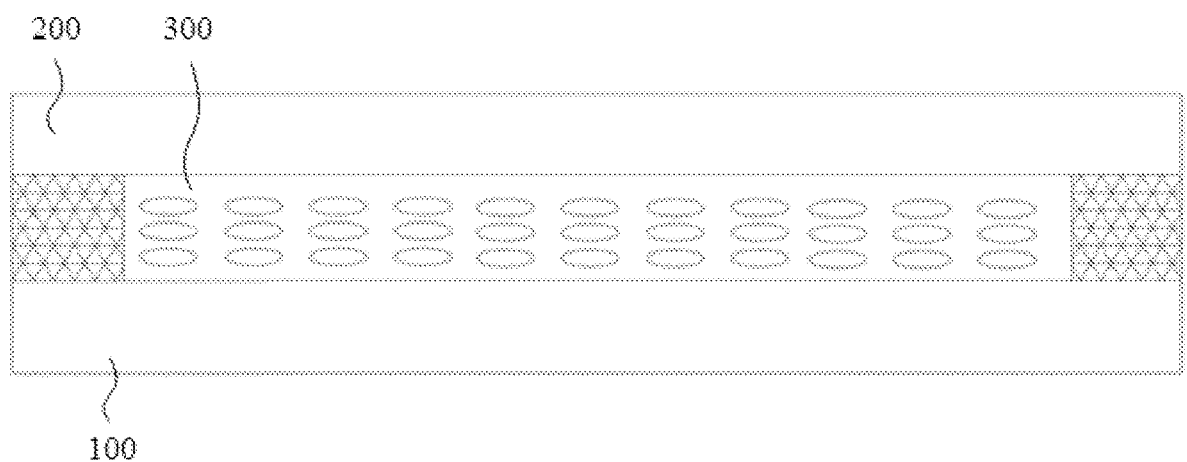
FIG. 6 is a schematic structural view of a display panel according to an embodiment of the present disclosure.

Referring to FIG. 6, the display panel includes a color film substrate, a liquid crystal layer, and a touch array substrate, the specific structure of the touch array substrate can be referred to the embodiments. Since the touch array substrate adopts all the technical solutions of all the embodiments, it has at least all the advantages brought by the technical solutions of the embodiments, which will not be repeated here. The liquid crystal layer is provided between the touch array substrate and the color film substrate.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect application in other related technical fields are included in the scope of the present disclosure.

What is claimed is:

1. A touch array substrate, comprising a timing controller; wherein the timing controller is provided with a plurality of clock output terminals and a plurality of reception and detection terminals;

each clock output terminal is configured to output a clock signal, and each reception and detection terminal is configured to detect a signal potential of a connected receiving line;

the touch array substrate comprises:

a plurality of receiving lines, a plurality of transmitting lines and a transmitting driven unit; and a transmitting line wiring layer, a scanning line wiring layer, a data line wiring layer and a receiving line wiring layer stacked sequentially;

wherein each receiving line is connected to the reception and detection terminal of the timing controller;

each transmitting line is configured to be with the plurality of receiving lines to form a plurality of corresponding touch capacitors;

a plurality of clock input terminals of the transmitting driven unit are connected to the plurality of clock output terminals of the timing controller one-by-one;

a plurality of output terminals of the transmitting driven unit are connected to input terminals of the plurality of the transmitting lines one-by-one;

the transmitting driven unit is configured to sequentially output transmitting driven signals to the plurality of transmitting lines according to a plurality of received clock signals, to drive the plurality of transmitting lines to work sequentially;

the plurality of transmitting lines are provided in the transmitting line wiring layer, and the plurality of the receiving lines are provided in the receiving line wiring layer;

a plurality of scanning lines are provided in the scanning line wiring layer, and a plurality of data lines are provided in the data line wiring layer;

an extension direction of each transmitting line is the same as an extension direction of each scanning line, and an extension direction of each receiving line is the same as that of each data line;

a gap is provided between any two adjacent receiving lines, and each gap is provided with two opposite ends;

each transmitting line comprises:

a main transmitting line and at least one first auxiliary transmitting line;

wherein an extension direction of the main transmitting line is the same as an extension direction of each scanning line; and each first auxiliary transmitting line is provided in the gap, a first end of each first auxiliary transmitting line is connected to the main transmitting line, and a second end of each first auxiliary transmitting line is extended toward any one end of the gap; and the two adjacent receiving lines are spaced by a preset distance, so that the gap formed between the two adjacent receiving lines is rectangular.

2. The touch array substrate of claim 1, wherein each transmitting line is provided on a side of each scanning line facing away from the data line wiring layer.

3. The touch array substrate of claim 1, wherein each transmitting line further comprises:

at least one second auxiliary transmitting line;

wherein each second auxiliary transmitting line is provided in the gap where the first auxiliary transmitting line is provided;

a first end of each second auxiliary transmitting line is connected to the main transmitting line, and a second end of each second auxiliary transmitting line is extended toward another end of the gap.

4. The touch array substrate of claim 3, wherein each first auxiliary transmitting line is the same in length as each second auxiliary transmitting line.

5. The touch array substrate of claim 1, wherein the plurality of clock output terminals of the timing controller sequentially output clock signals with a first preset potential; and the transmitting driven unit comprises: a plurality of row driving circuits;

a clock input terminal of each row driving circuit is connected to the clock output terminal of the timing controller, and an output terminal of each row driving circuit is connected to the transmitting line; and each row driving circuit is configured to output the transmitting driven signal to the connected transmitting line when receiving the clock signal with the first preset potential.

6. A display panel, comprising: a color film substrate, a liquid crystal layer, and the touch array substrate of claim 1, wherein the liquid crystal layer is provided between the touch array substrate and the color film substrate.

* * * * *